(12) United States Patent
Suhara

(10) Patent No.: US 6,891,678 B2
(45) Date of Patent: May 10, 2005

(54) LENS FOR OPTICAL SCANNING, OPTICAL SCANNER, AND IMAGE FORMING APPARATUS

(75) Inventor: Hiroyuki Suhara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 10/735,690

(22) Filed: Dec. 16, 2003

(65) Prior Publication Data

US 2004/0179255 A1 Sep. 16, 2004

(30) Foreign Application Priority Data

Dec. 16, 2002 (JP) ........................ 2002-364278

(51) Int. Cl.⁷ .................. G02B 3/00; G02B 26/08; B41J 27/00
(52) U.S. Cl. .................. 359/654; 359/652; 359/205; 359/216; 347/259
(58) Field of Search ................ 359/652, 654, 359/662, 205–207, 212–219; 347/256–261

(56) References Cited

U.S. PATENT DOCUMENTS

| | | | |
|---|---|---|---|
| 5,834,766 A | 11/1998 | Suhara | 250/234 |
| 6,081,386 A | 6/2000 | Hayashi et al. | 359/641 |
| 6,376,837 B1 | 4/2002 | Itabashi et al. | 250/234 |
| 6,400,391 B1 | 6/2002 | Suhara et al. | 347/244 |
| 6,532,094 B2 | 3/2003 | Suhara | 359/205 |
| 6,555,810 B1 | 4/2003 | Suhara | 250/234 |
| 6,744,545 B2 * | 6/2004 | Suhara et al. | 359/205 |
| 2003/0063358 A1 * | 4/2003 | Suhara | 359/205 |
| 2003/0156310 A1 * | 8/2003 | Suzuki et al. | 359/196 |
| 2003/0179428 A1 * | 9/2003 | Suzuki et al. | 259/204 |
| 2003/0214693 A1 * | 11/2003 | Hayashi et al. | 359/204 |
| 2004/0036936 A1 * | 2/2004 | Nakajima et al. | 359/204 |
| 2004/0057096 A1 * | 3/2004 | Amada et al. | 359/204 |

FOREIGN PATENT DOCUMENTS

| | | | |
|---|---|---|---|
| JP | 10-288749 | * | 10/1998 |
| JP | 11-044641 | * | 2/1999 |

* cited by examiner

Primary Examiner—Scott J. Sugaman
Assistant Examiner—Jack Dinh
(74) Attorney, Agent, or Firm—Oblon, Spivak, McClelland, Maier & Neustadt, P.C.

(57) ABSTRACT

A lens for optical scanning condenses luminous flux deflected by an optical deflector to a plane to be scanned in a scanning image forming optical system. The lens is made of a plastic material by molding. A reference axis of an N-th order approximating curve of refractive index distribution $\Delta n(x)$ of the lens is away from a center of a passing area, through which the luminous flux passes in the lens, by equal to or more than 10% of the width of the passing area.

15 Claims, 15 Drawing Sheets

FIG. 3A
FIG. 3B
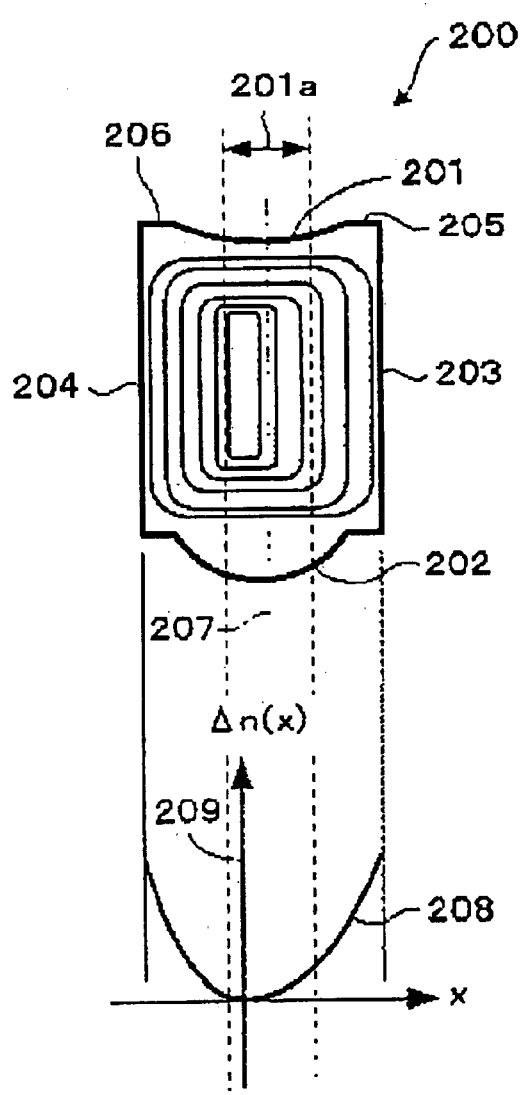
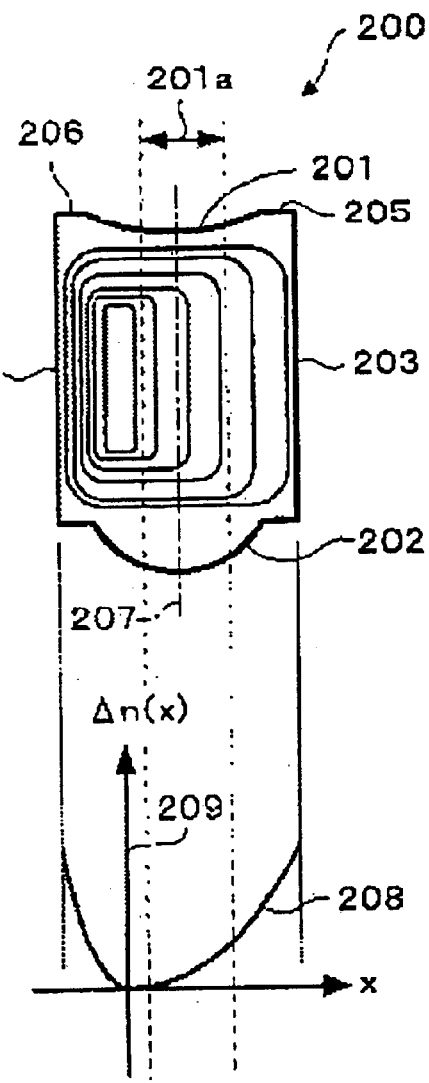

US 6,891,678 B2

LENS FOR OPTICAL SCANNING, OPTICAL SCANNER, AND IMAGE FORMING APPARATUS

CROSS-REFERENCE TO RELATED APPLICATIONS

The present document incorporates by reference the entire contents of Japanese priority document, 2002-364278 filed in Japan on Dec. 16, 2002.

BACKGROUND OF THE INVENTION

1) Field of the Invention

The present invention relates to a technology to reduce spreading or spot positioning error of a beam caused by defocusing of the beam.

2) Description of the Related Art

FIG. 13 is a schematic diagram of a generally used scanning image forming optical system. The system includes a laser light source 10, a beam diameter correcting lens 12, an aperture 14, a cylindrical lens 16, a mirror 18, a polygon mirror 20 as a light polarizer, an optical scanning lens 30, and a photosensitive surface 40 as a surface to be scanned.

The luminous flux emitted from the laser light source 10 reaches the polygon mirror 20 through the beam diameter correcting lens 12, the cylindrical lens 16, and the mirror 18. The reflected luminous flux is polarized by the polygon mirror rotating in one direction, enters into the optical scanning lens 30, while moving in one direction, and is scanned in one direction at a substantially constant velocity on the photosensitive surface 40.

As the optical scanning lens 30 used in the scanning image forming optical system, one formed by molding a plastic material is now being used. As one problem when the optical scanning lens 30 is formed by molding a plastic material, there is a fatal problem in that refractive index distribution occurs in the formed optical scanning lens.

In the plastics molding, a thermally melt plastic material is molded by a mold, and cooled in the mold. However, since cooling at the peripheral portion is faster than that at the center of the mold, non-uniform distribution in density occurs in the plastic, that is, a phenomenon in which the density in the portion where cooling occurs quickly becomes relatively higher with respect to the density in the portion where cooling occurs slowly, or transforming occurs, and the refractive index is not uniform inside the formed lens, thereby causing the refractive index distribution.

When there is the refractive index distribution, a change in the focal length, that is, defocus occurs with respect to a focal length designed as a uniform refractive index, and a beam waist position changes from the designed position. Therefore, it is desired, in view of the optical performance, that the refractive index distribution is small. However, it imposes a large restriction on the cost, at the time of machining it.

An example is known, in which a change in a spot diameter on the photosensitive member, which occurs due to a non-uniform change of the beam waist position with respect to the main scanning direction, is suppressed within a tolerance (for example, see Japanese Patent Application Laid-open No. H10-288749).

Generally, the refractive index becomes high at the peripheral portion of the lens, and becomes minimum near the center of the area through which the luminous flux passes. However, it is known that there is an example in which the refractive index becomes the largest in the vicinity of the center, according to the manufacturing conditions. In the explanation below, an example in which the distribution curve is basically protruding downward will be explained.

However, it has been found that in the vicinity of the center, the refractive index distribution is not always stable, and there is a large difference for each molding article. This is because slight additives and impurities added at the time of molding are likely to gather in the vicinity of the center, due to different properties such as density from those of the plastic material, and as a result, a difference in the refractive index distribution occurs, which is slightly different for each molded article.

It is necessary to suppress the occurrence of out-of-color registration, in order to realize a high quality color image, and hence it is necessary to improve the position accuracy of the beam spot. Hence, the difference in refractive index distribution should be suppressed for each scanning lens as much as possible. In order to do that, it is necessary to know how the refractive index distribution of the actual scanning lens is, but fortunately, a nondestructive method of studying the refractive index distribution has been established (for example, see Japanese Patent Application Laid-open No. H11-44641).

On the other hand, it is generally said that the refractive index distribution occurring due to the plastics molding shows distribution close to a quadratic curve, and approximated by the following quadratic expression:

$$\Delta n(x) \approx n_0 + \Delta n \cdot x^2 (\Delta n > 0)$$

However, in a strict sense, there is a tendency such that as it is away from the minimum value, the quadratic coefficient $\Delta n$ becomes gradually smaller locally. Since the defocus amount of the beam is in proportion to the quadratic coefficient $\Delta n$, it is desired that $\Delta n$ be as small as possible.

Therefore, by designating the area away from the minimum value as an area through which the luminous flux of the beam passes, an area having $\Delta n$ as small as possible is used. As a result, the influence of defocus due to the refractive index distribution can be reduced.

Recently, image forming apparatus using four photosensitive drums becomes predominant, with a progress of colorization. It is necessary to develop a lens and an optical scanner for achieving high speed, high quality image, low cost, and space saving. With respect to such demands, it is necessary to provide an optical scanning lens in which the refractive index distribution is reduced.

If a difference in the refractive index distribution for each product is reduced, and an optical scanning lens having a stable quality can be obtained, it is advantageous for obtaining a multi-beam. Realization of the multi-beam can reduce the number of rotation of a deflector such as a polygon scanner. As a result, high durability, low noise, and low power consumption can be realized.

FIG. 14 depicts a beam diameter spreading when a defocusing of the beam occurs. The X axis indicates a defocus amount, designating the photosensitive surface as a reference value 0, and the Y axis indicates a diameter of the luminous flux, a so-called beam diameter. If the optical system is manufactured according to the design, the beam diameter is such that, as shown in FIG. 14, the beam waist is located on the photosensitive surface. In other words, the beam diameter becomes minimum on the photosensitive surface, and an image having a high resolution can be obtained. However, as described above, if there is the refractive index distribution in the optical scanning lens, defocus occurs. When the distribution is such that the refractive index becomes minimum in the center portion, the distribution works in the direction that the lens power is reduced, thereby extending the focal length. Therefore, the beam waist moves in the direction away from the optical scanning lens, and as shown in FIG. 14, the beam diameter on the photosensitive surface increases.

SUMMARY OF THE INVENTION

It is therefore an object of the present invention to solve at least the problems in the conventional technology.

The lens according to one aspect of the present invention is made by molding a plastic material so that a reference axis corresponding to a turning point of an N-th order approximating curve of refractive index distribution $\Delta n(x)$ of the lens is displaced from a center of a passing area by a distance that is equal to or greater than 10% of a width of the passing area, where a luminous flux passes in the lens through the passing area.

The lens according to another aspect of the present invention includes a plurality of passing areas through each of which a luminous flux passes in the lens simultaneously. The lens is made by molding a plastic material so that, for each of the passing areas, a reference axis corresponding to a turning point of an N-th order approximating curve of refractive index distribution $\Delta n(x)$ of the lens is displaced from a center of the passing area by a distance that is equal to or greater than 10% of a width of the passing area. The passing areas are arranged in parallel with a center line of an external shape of the lens, being formed in one.

The optical scanner according to still another aspect of the present invention includes a light source that produces a luminous flux, an optical deflector having a deflecting reflection surface that deflects the luminous flux from the light source at same angular velocity, and a lens made by molding a plastic material, the lens condensing the luminous flux deflected as an optical spot on a plane to be scanned to perform optical scanning of the plane at a constant velocity. A reference axis corresponding to a turning point of an N-th order approximating curve of refractive index distribution $\Delta n(x)$ of the lens is displaced from a center of a passing area by a distance that is equal to or greater than 10% of a width of the passing area, where the luminous flux passes in the lens through the passing area.

The image forming apparatus according to still another aspect of the present invention includes an optical scanner that includes a light source that produces a luminous flux, an optical deflector having a deflecting reflection surface that deflects the luminous flux from the light source at same angular velocity, and a lens made by molding a plastic material, the lens condensing the luminous flux deflected as an optical spot on a plane to be scanned to perform optical scanning of the plane at a constant velocity. A reference axis corresponding to a turning point of an N-th order approximating curve of refractive index distribution $\Delta n(x)$ of the lens is displaced from a center of a passing area by a distance that is equal to or greater than 10% of a width of the passing area, where the luminous flux passes in the lens through the passing area.

The method of manufacturing a lens according to still another aspect of the present invention includes forming the lens having a center line and two sides with respect to the center line by molding a plastic material, and cooling the two sides with a different cooling rate.

The other objects, features and advantages of the present invention are specifically set forth in or will become apparent from the following detailed descriptions of the invention when read in conjunction with the accompanying drawings.

BRIEF DESCRIPTION OF THE DRAWING

FIG. 3A and FIG. 3B are schematic diagrams of lenses for optical scanning according to a third embodiment of the present invention;

DETAILED DESCRIPTIONS

Exemplary embodiments of a lens for optical scanning, an optical scanner, and an image forming apparatus according to the present invention are explained in detail with reference to the accompanying drawings. However, it is to be noted that the invention is not limited by the embodiments described herein.

Figure 1:
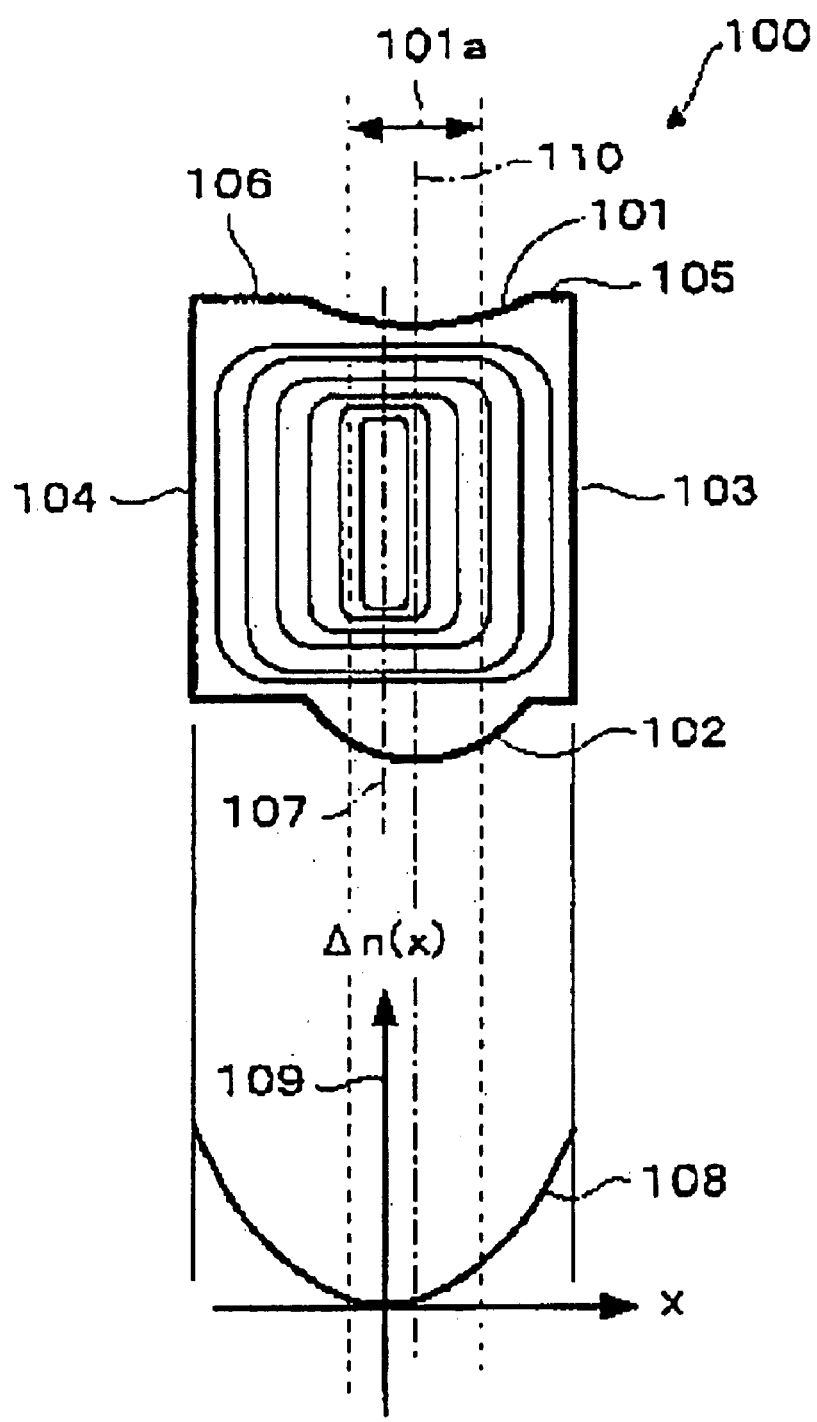
FIG. 1 is a schematic diagram of a lens for optical scanning according to a first embodiment of the present invention.

FIG. 1 is a schematic diagram of a lens for optical scanning according to a first embodiment of the present invention. Reference sign 100 denotes a scanning lens, 101 denotes an incident plane of the luminous flux, 101a denotes an area through which the luminous flux passes, 102 denotes an outgoing plane of the luminous flux, 103 and 104 denote opposite sides facing the sub scanning direction, 105 and 106 respectively denote an edge connected to the respective sides, 107 denotes a centerline with respect to the external shape in the sub scanning direction, 108 denotes a quadratic approximating curve of the refractive index distribution $\Delta n(x)$, 109 denotes an axis of symmetry of the quadratic approximating curve, and 110 denotes the center of the passing area. Reference sign 101a denotes an area on the incident plane 101, through which the luminous flux passes.

In the normal molding method, since the refractive index distribution in the sub scanning direction becomes substantially symmetric, the axis of symmetry 109 agrees with the centerline 107 with respect to the external shape.

In this-embodiment, one of the edges 106 is made thicker than the other edge 105, with respect to the luminous flux passing area 101a of the optical scanning lens 100. Therefore, the axis of symmetry 109 of the quadratic approximating curve 108 of the refractive index distribution Δn(x) is deviated from the center 110 of the luminous flux passing area 101a.

As being away from the center, PV (peak-to-valley, a difference between the maximum value and the minimum value) of Δn(x) increases, but the quadratic coefficient Δn has a gradually decreasing tendency. Therefore, the defocus amount occurring from the quadratic coefficient Δn decreases. Further, since the amount of light is less in the peripheral portion of the luminous flux than in the center thereof, the influence of a difference between the molded articles in the vicinity of the extreme value becomes relatively small. If the axis of symmetry is away by 10% or more of the width in the sub scanning direction of the passing area, the effect thereof appears dramatically.

Figure 2:
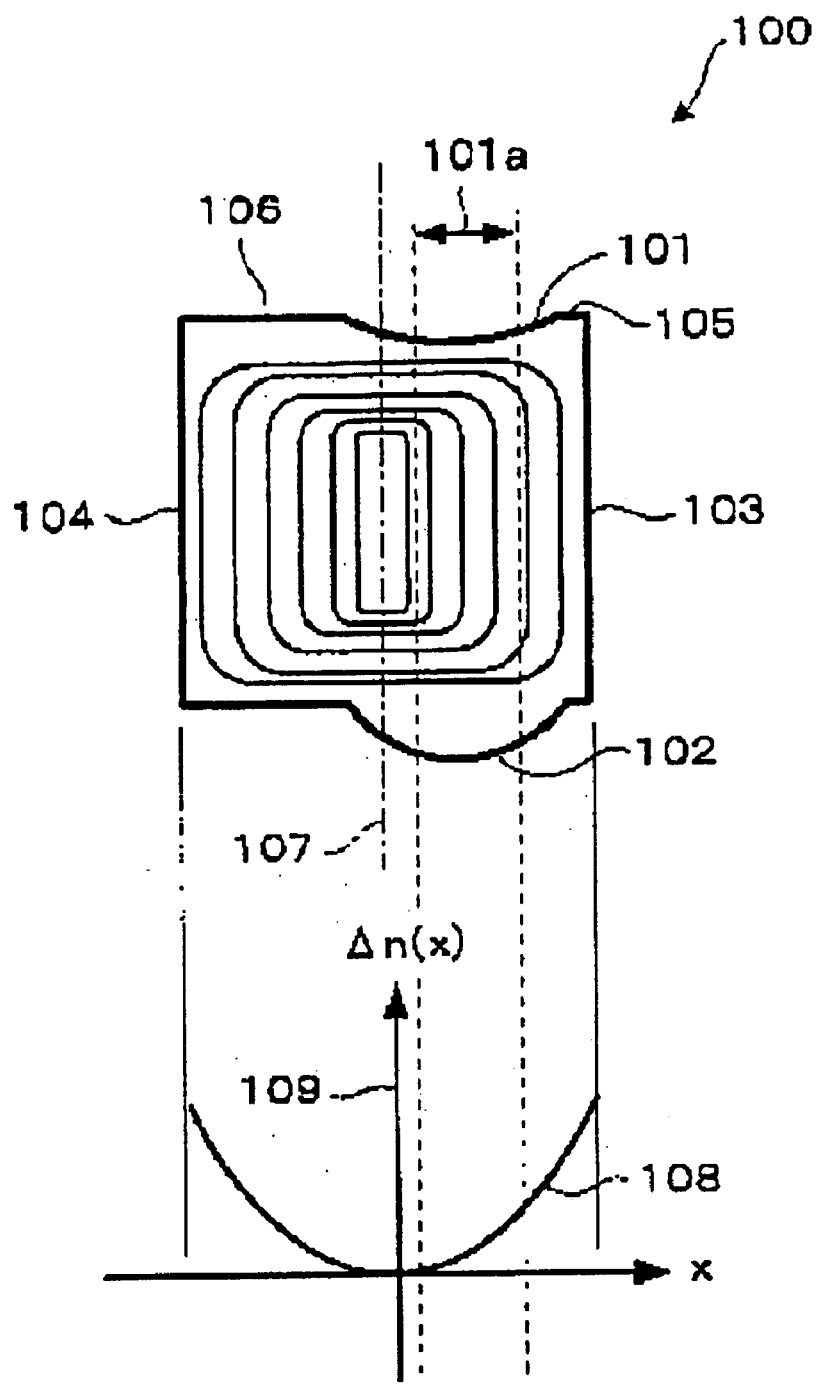
FIG. 2 is a schematic diagram of a lens for optical scanning according to a second embodiment of the present invention.

FIG. 2 is a schematic diagram of a lens for optical scanning according to a second embodiment of the present invention. One edge 106 is further thickened with respect to the passing area 101a. Therefore, the centerline 107 with respect to the external shape is deviated from the passing area 101a. Therefore, it can be said that a relative minimum in the refractive index distribution exists outside the passing area. As a result, the quadratic coefficient Δn further decreases, and stabilization of the molded article can be expected.

FIG. 3A and FIG. 3B are schematic diagrams of lenses for optical scanning according to a third embodiment of the present invention. Reference sign 200 denotes an optical scanning lens, 201 denotes an incident plane of the luminous flux, 202 denotes an outgoing plane of the luminous flux, 203 and 204 denote opposite sides facing the sub scanning direction, 205 and 206 respectively denote an edge connected to the respective sides, 207 denotes a centerline with respect to the external shape in the sub scanning direction, 208 denotes the N-th order approximating curve of the refractive index distribution Δn(x), and 209 denotes the position of the minimum value on this curve. Reference sign 201a denotes an area on the incident plane 201, through which the luminous flux passes.

Since the thickness of the edges 205 and 206 are nearly the same, the center 207 with respect to the external shape of the lens and the center of the luminous flux substantially agree with each other. However, by changing the cooling rate of the mold on the sides 203 and 204, the refractive index distribution is made asymmetric.

Figure 4:
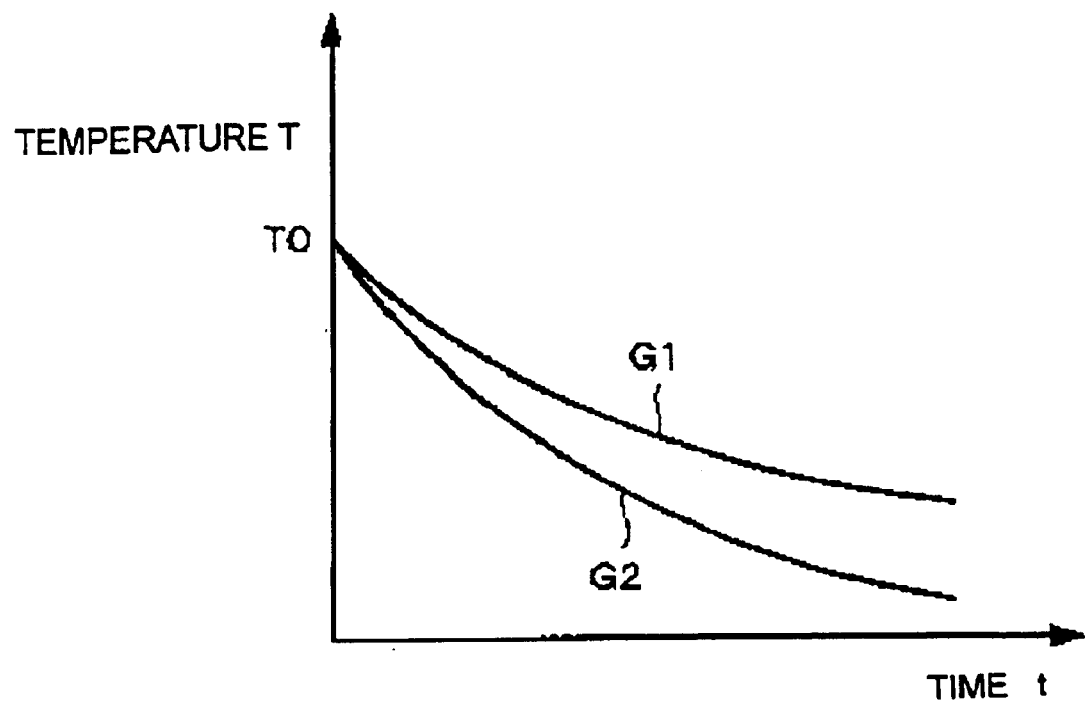
FIG. 4 is a graph for explaining effect of changing cooling rate on two sides of the lens.

FIG. 4 is a graph for explaining effect of changing cooling rate on two sides of the lens. Reference sign G1 indicates the transition of the mold temperature on the side 203, and G2 indicates the transition of the mold temperature on the side 204, respectively, in the chart. These temperatures are properly controlled according to the requirement specification.

When the cooling rate is fast, that is, when the mold is rapidly cooled, the refractive index distribution and the refractive index gradient are likely to increase, and hence the minimum value in the refractive index distribution biases toward the side 204 having the faster cooling rate. By changing the molding condition, even when the external shape is the same, the shape of the refractive index distribution can be changed.

In this case, however, the whole refractive index distribution Δn(x) cannot be approximated by the quadratic curve.

In other words, the whole curve cannot be expressed correctly, unless an approximating curve of a higher order than the quadratic curve is applied. Therefore, if the refractive index distribution is generally approximated by the N-th order curve, designating N as an integer not smaller than 2, the distribution curve shown in FIGS. 1 to 6 can be expressed in a unified manner. If the approximating curve is symmetric having the minimum value in the center, the quadratic curve is sufficient to express the curve.

In the case of quadratic curve, the position of the minimum value is at the position of the axis of symmetry, but in the general N-th order curve, the position thereof is not always at the position of the axis of symmetry. In the configuration of the embodiments shown above, the minimum value in the refractive index distribution has appeared only at one position. However, a straight line drawn in the y-axis direction at the position where the extreme value exists, including the refractive index distribution curve having an upward protrusion explained later, is referred to as a reference axis, for the convenience sake. As shown in FIGS. 3A and 3B, the position 209 of the minimum value in the curve becomes the reference axis.

In the luminous flux passing area 201a, since the center thereof is set at a position away from the reference axis, even if the distribution curve is asymmetric, only one side of the reference axis is mainly used. Therefore, even when the refractive index distribution is approximated by the quadratic curve, a large error may not occur.

Figure 5:
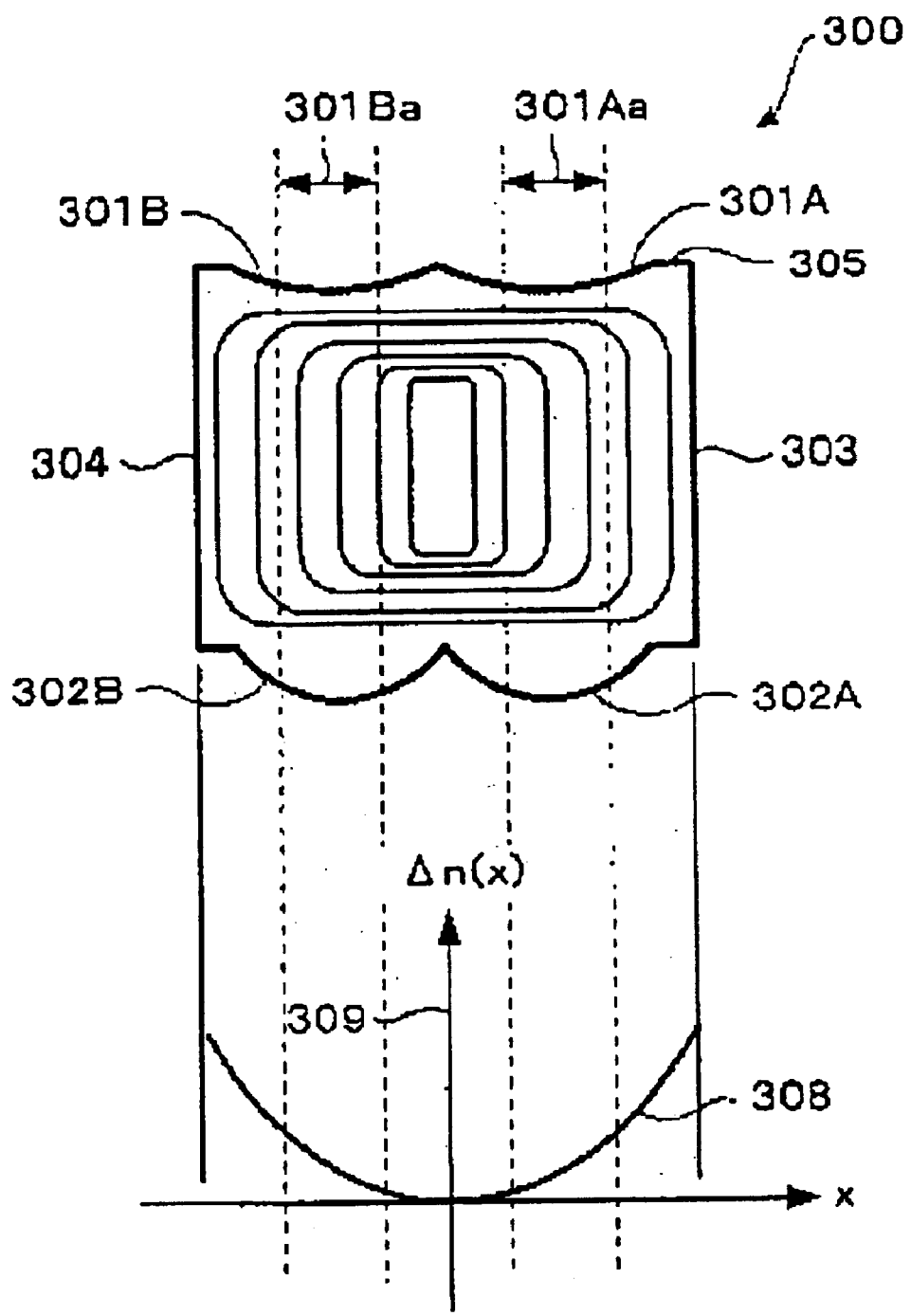
FIG. 5 is a schematic diagram of a lens for optical scanning according to a fourth embodiment of the present invention.

FIG. 5 is a schematic diagram of a lens for optical scanning according to a fourth embodiment of the present invention. Reference sign 300 denotes an optical scanning lens, 301A and 301B denote incident planes of the luminous flux, 301Aa and 301Ba denote luminous flux passing areas, 302A and 302B denote outgoing planes of the luminous flux, 303 and 304 denote opposite sides facing the sub scanning direction, 305 and 306 denote edges connected to the respective sides, 307 denotes a centerline with respect to the external shape in the sub scanning direction, 308 denotes the N-th order approximating curve of the refractive index distribution Δn(x), and 309 denotes a reference axis of the curve.

This embodiment indicates an optical scanning lens having two passing areas. Two lenses are connected in the sub scanning direction, and integrally formed. With such a configuration, even if the cooling rate is not changed between the left and right sides 303 and 304, and even if there is no difference in thickness between the edges 305 and 306, the similar effect to that described above can be obtained. According to this configuration, further, parts can be shared, thereby enabling space saving. Particularly, a large effect can be demonstrated, by using this embodiment in a color image forming apparatus having a complicated configuration.

Figure 6:
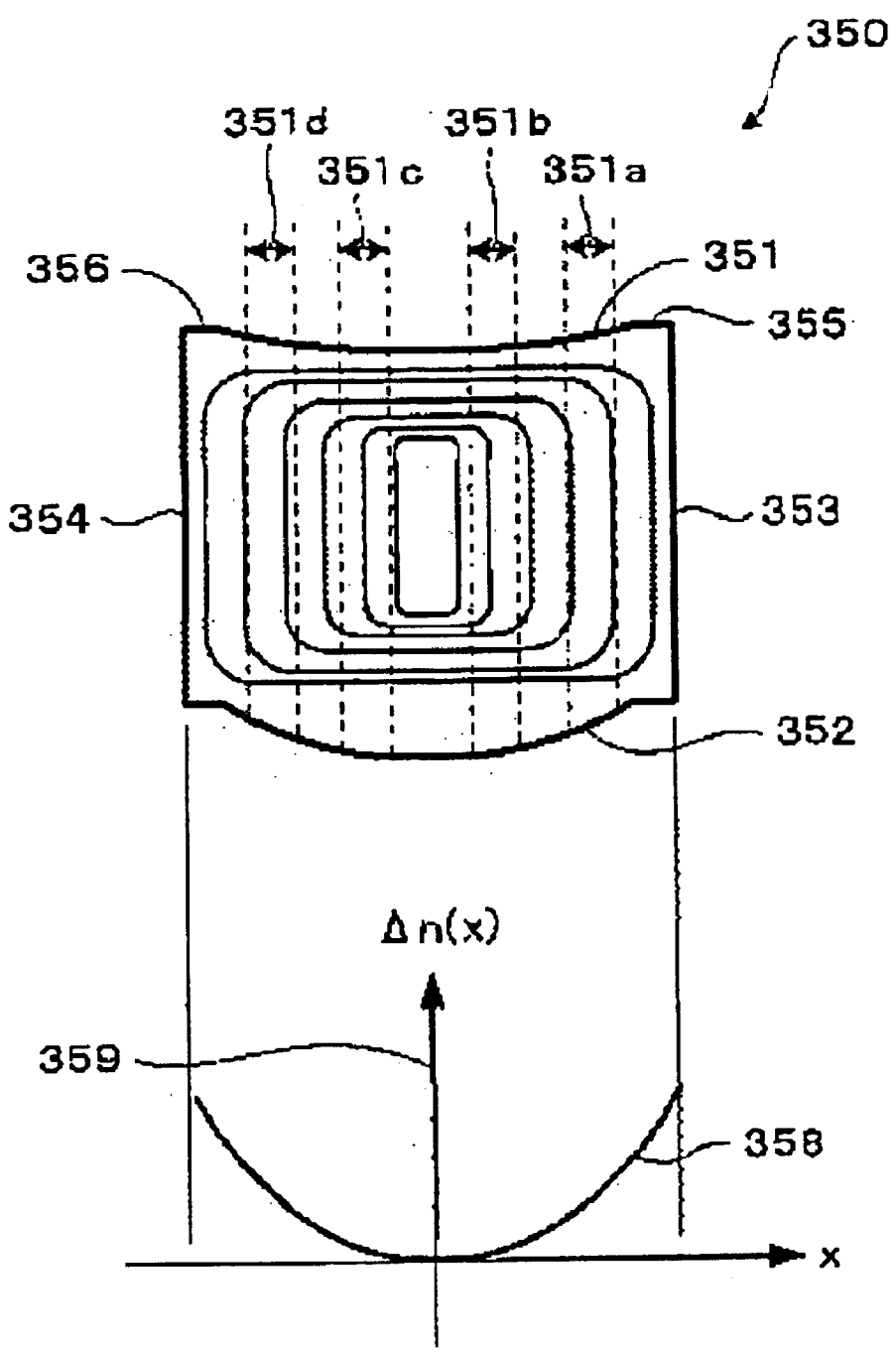
FIG. 6 is a schematic diagram of a lens for optical scanning according to a fifth embodiment of the present invention.

FIG. 6 is a schematic diagram of a lens for optical scanning according to a fifth embodiment of the present invention. Reference sign 350 denotes an optical scanning lens, 351 denotes an incident plane of the luminous flux, 351a to 351d denote luminous flux passing areas, 352 denotes an outgoing plane of the luminous flux, 353 and 354 denote opposite sides facing the sub scanning direction, 355 and 356 denote edges connected to the respective sides, 358 denotes the N-th order approximating curve of the refractive index distribution Δn(x), and 359 denotes a position of the minimum value in the curve.

In this embodiment, four beams pass through the same optical scanning lens 350. The refractive index distribution Δn(x) is formed symmetric to be approximated by the quadric curve, and the passing areas 351b and 351c close to the reference axis are respectively set at positions that do not include the reference axis. Therefore, in the four beams, the defocus amount can be suppressed. By using the optical scanning lens 350 having the configuration according to this embodiment for an optical system, which performs write by the multi-beam, together with an additional optical system, the configuration can be made simple, even if the present invention is applied.

In the explanation above, an example in which the whole refractive index distribution Δn(x) shows a curve protruding downward has been explained. However, according to the manufacturing conditions, the optical scanning lens in which the refractive index distribution Δn(x) shows a curve protruding upward may be obtained. In this case, if the quadratic approximating curve is applied thereto, the quadratic coefficient Δn has a negative sign. In the explanation below, Δn including the positive and negative signs is taken into consideration, so that both approximating curves can be applied.

Figure 7:
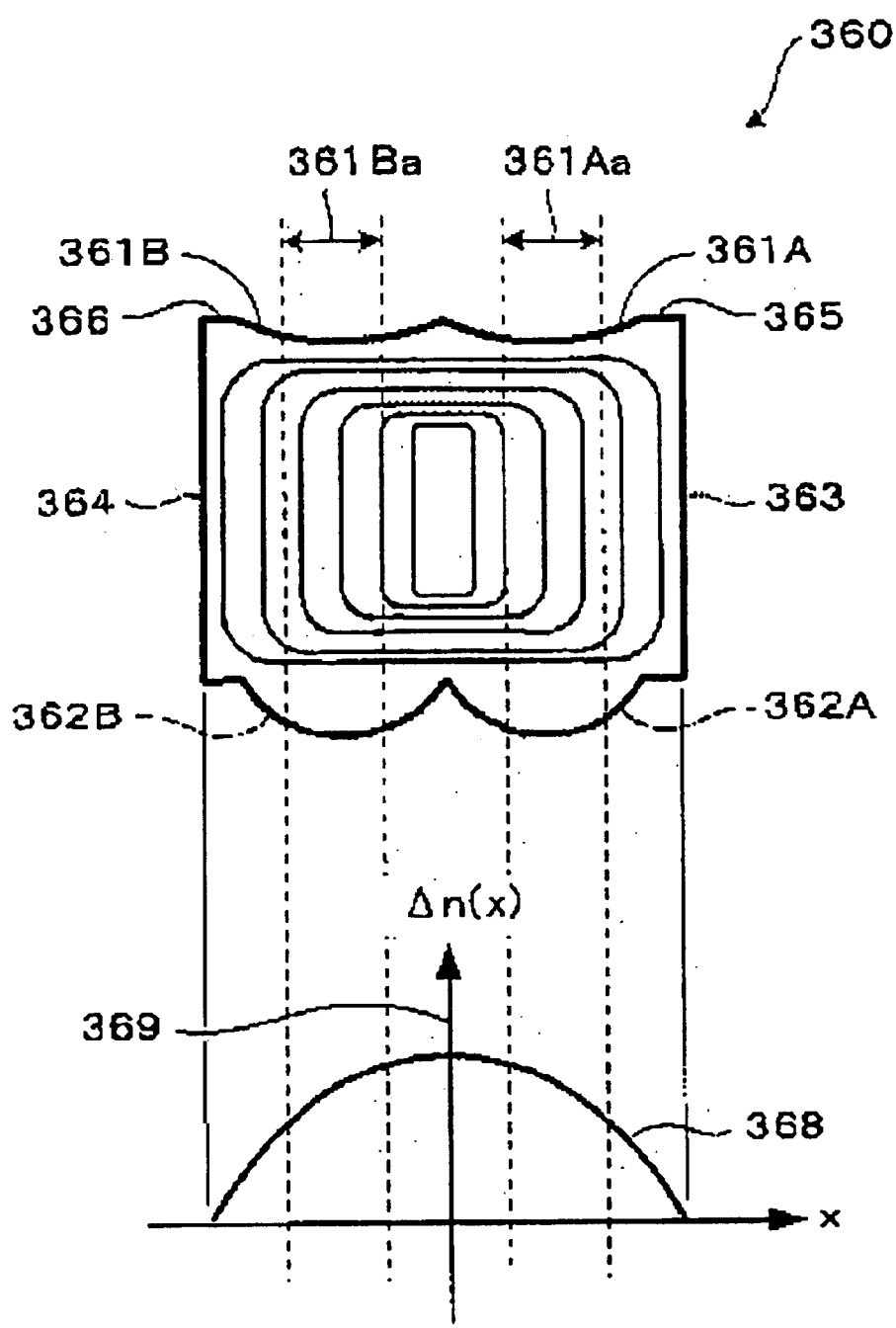
FIG. 7 depicts a configuration of a lens having a refractive index distribution curve opening downwards.

FIG. 7 depicts a configuration of a lens having a refractive index distribution curve opening downwards. Reference sign 360 denotes an optical scanning lens, 361 denotes an incident plane of the luminous flux, 361Aa and 361Ba denote luminous flux passing areas, 362A and 362B denote outgoing planes of the luminous flux, 363 and 364 denote opposite sides facing the sub scanning direction, 365 and 366 denote edges connected to the respective sides, 368 denotes the N-th order approximating curve of the refractive index distribution Δn(x), and 369 denotes a position of the maximum value in the curve.

In this example, the position 369 of the maximum value becomes the position of the reference axis. The quadratic coefficient Δn obtained when this curve is approximated by the secondary order has a negative sign.

Figure 8:
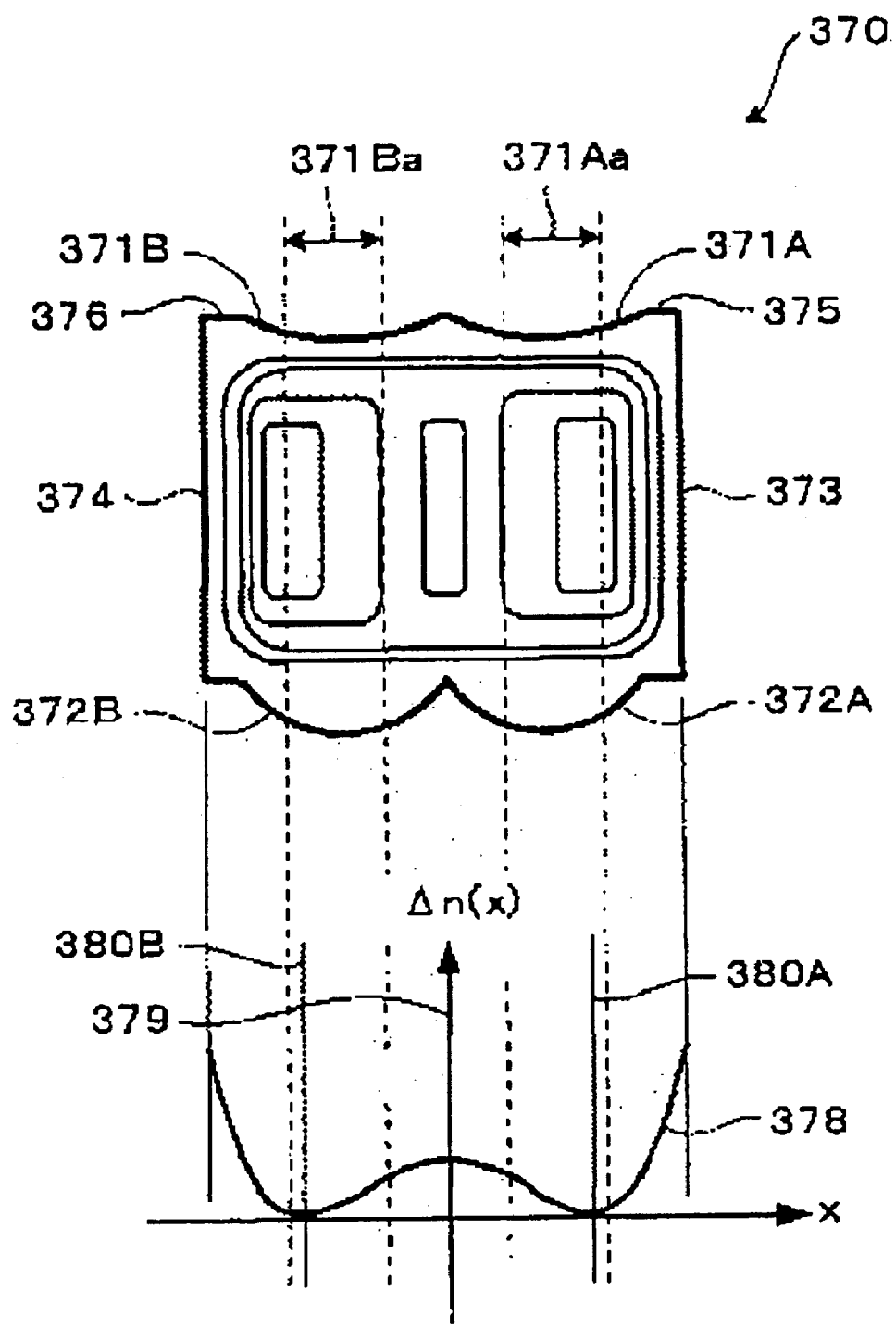
FIG. 8 depicts a configuration of a lens having a distribution curve opening upwards and downwards.

FIG. 8 depicts a configuration of a lens having a distribution curve opening upwards and downwards. Reference sign 370 denotes an optical scanning lens, 371 denotes an incident plane of the luminous flux, 371Aa and 371Ba denote luminous flux passing areas, 372A and 372B denote outgoing planes of the luminous flux, 373 and 374 denote opposite sides facing the sub scanning direction, 375 and 376 denote edges connected to the respective sides, 378 denotes the N-th order approximating curve of the refractive index distribution Δn(x), 379 denotes a position of the relative maximum in the curve, and 380A and 380B denote the position of the minimum value, respectively.

In this example, there are three reference axes, and in order to approximate the whole curve, at least a quadratic approximation formula is required. The three reference axes are respectively at positions deviated from the center of the passing areas 371A and 371B. Since the curved portions included in the both passing areas are both protruding downward, when these portions are approximated by the quadratic formula respectively independently, the sign of the quadratic coefficient Δn becomes positive.

Figure 9:
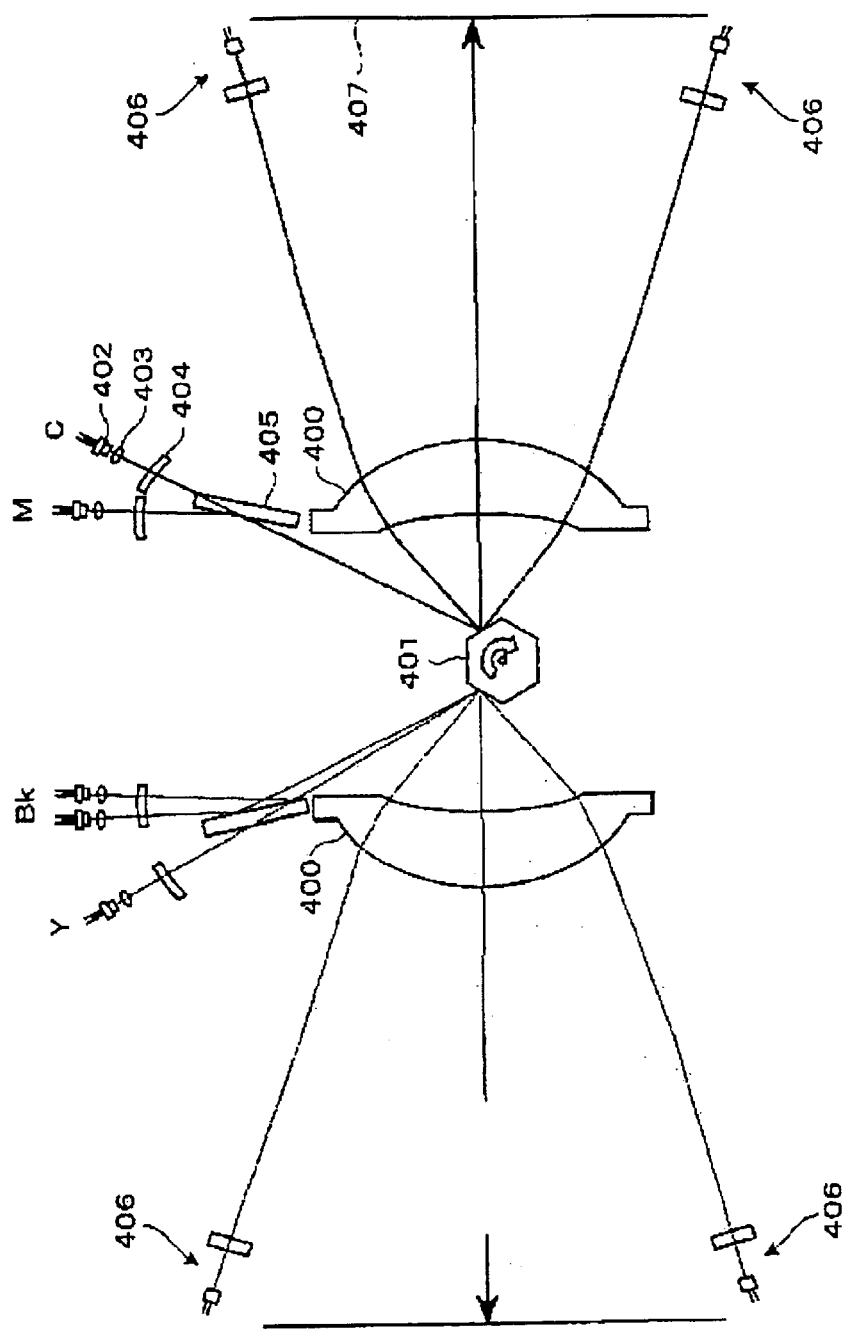
FIG. 9 is a top plan view of an optical scanner for a four-drum type image forming apparatus.
Figure 10:
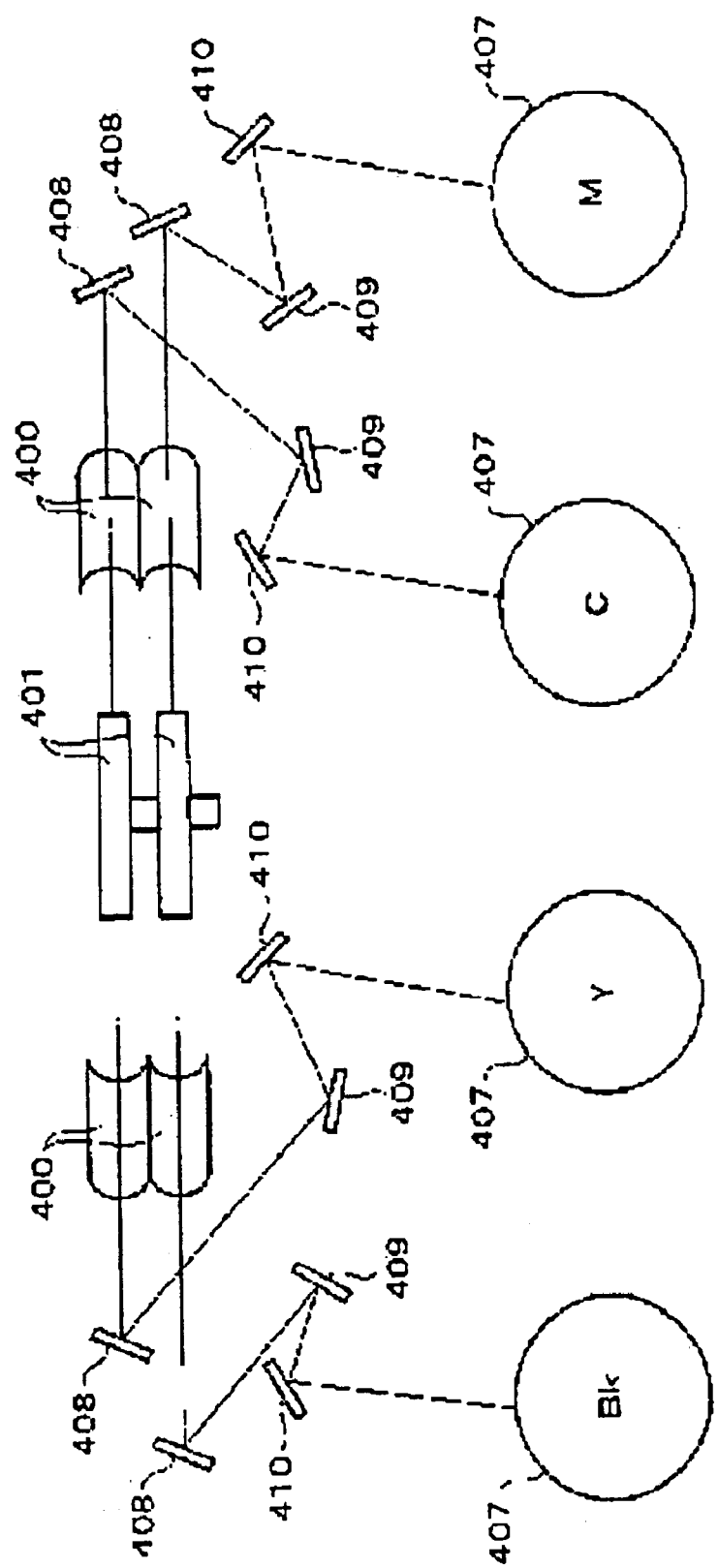
FIG. 10 is a side view of the optical scanner for the four-drum type image forming apparatus.

FIG. 9 and FIG. 10 are a top plan view and a side view of an optical scanner for a four-drum type image forming apparatus, respectively. Reference sign 400 denotes an optical scanning lens, 401 denotes an incident plane of the luminous flux, 401 denotes a deflector, 402 denotes a light source, 403 denotes a coupling lens, 404 denotes a cylindrical lens, 405 denotes a mirror for the light source, 406 denotes a photo detector for synchronization, 407 denotes a photosensitive member as a plane to be scanned, and 408, 409, and 410 respectively denote first, second, and third mirrors. Reference signs Y, M, C, and BK respectively denote a color.

In the recent color printers and color copying machines, as shown in FIGS. 9 and 10, image forming apparatus using four photosensitive drums, cyan (C), magenta (M), yellow (Y), and black (BK), is predominant, in order to correspond to high-speed printing. Accompanying this, four optical scanners having substantially the same optical performance are required. Further, it is desired that the parts can be shared and integrally formed, in order to achieve low cost and space saving. Integral molding by overlapping two lenses is effective with respect to such a demand, and further, the position of the relative minimum in the refractive index distribution can be shifted from the luminous flux passing area.

For the optical scanning lens 400, four optical scanning lenses having the configuration shown in FIGS. 1 to 3 may be used, or two optical scanning lenses having the configuration shown in FIGS. 5, 7, and 8 may be used. Further, in the case of the multi-beam scanning method, a plurality of optical scanning lenses 350 shown in FIG. 6 may be used.

Figure 13:
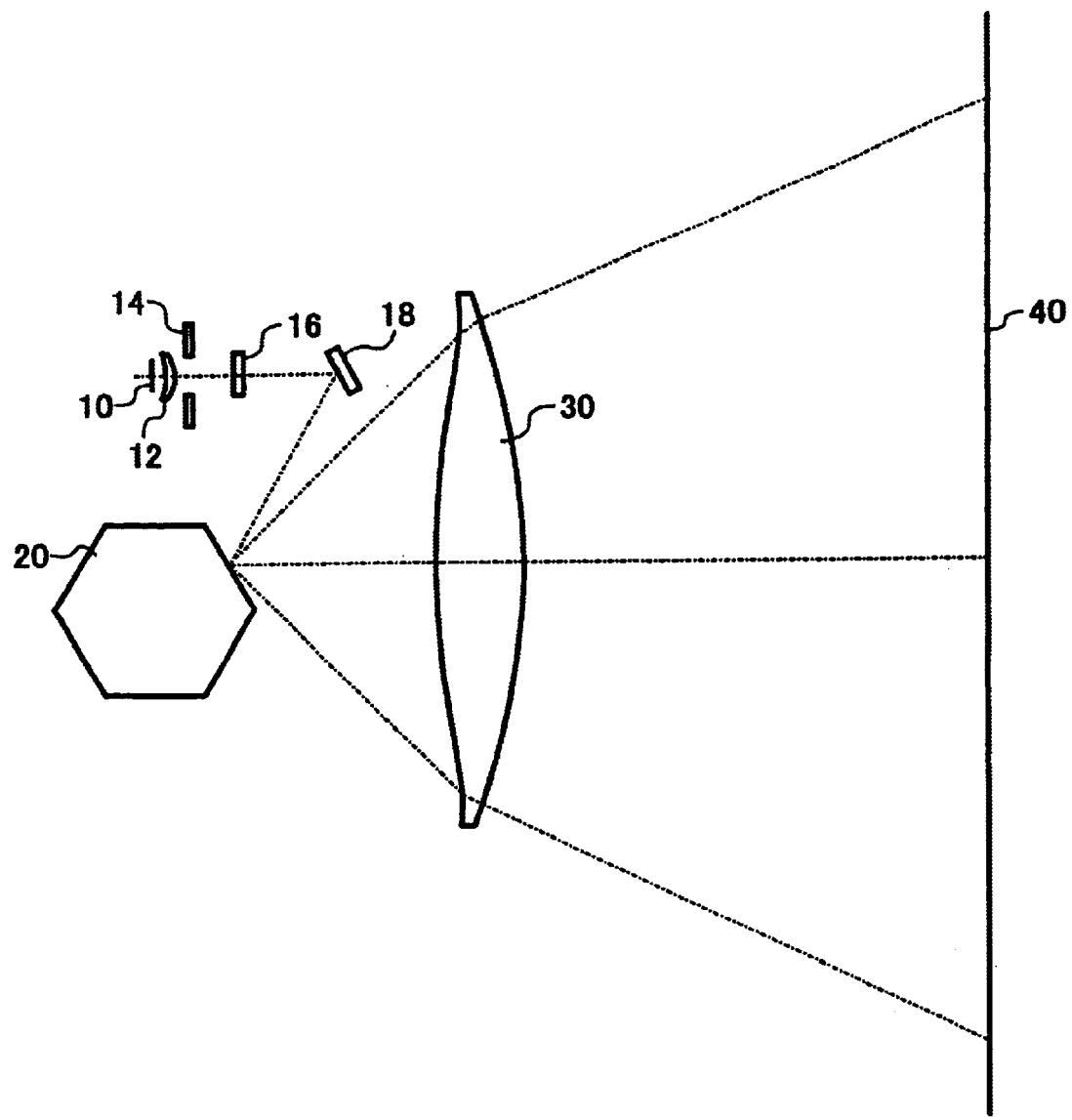
FIG. 13 is a schematic diagram of a generally used scanning image forming optical system.
Figure 14:
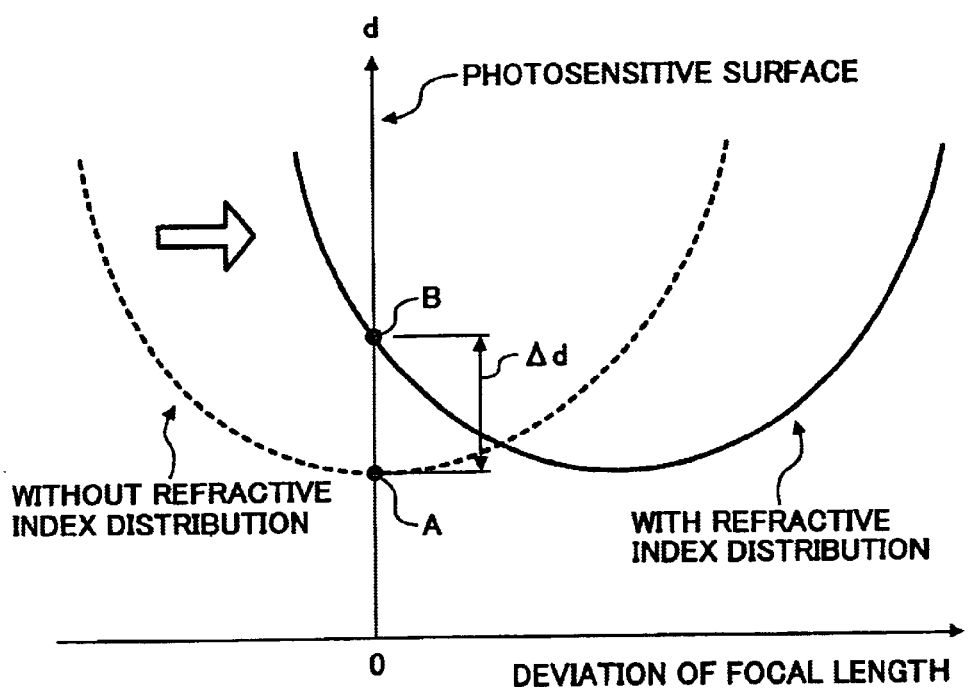
FIG. 14 depicts a beam diameter spreading when a defocusing of the beam occurs.

An example in which the optical scanning lens according to the present invention is applied to the optical scanner shown in FIG. 13 will be explained. The optical scanning lens 30 is formed of a polyolefin resin. Since the general explanation relating to the optics, that is, the laser diode (LD) wavelength, the focal length of the lens, and the lens shape, is provided in Japanese Patent Application Laid-open No. H10-288749, the explanation here is omitted.

The optical scanning lens 30 according to the present invention is an optical scanning lens that condenses the luminous flux deflected by the optical deflector into the vicinity of the plane to be scanned, and is formed of a polyolefin resin by plastics molding, and satisfies the conditional expression below:

$$|\Delta n(x) - \Delta n\_min| < 34 \times 10^{-5}$$

where nonuniformity of the refractive index existing in the lens is designated as refractive index distribution Δn(x), and the minimum value of Δn(x) is designated as Δn_min, within the luminous flux passing area of the lens.

Figure 15:
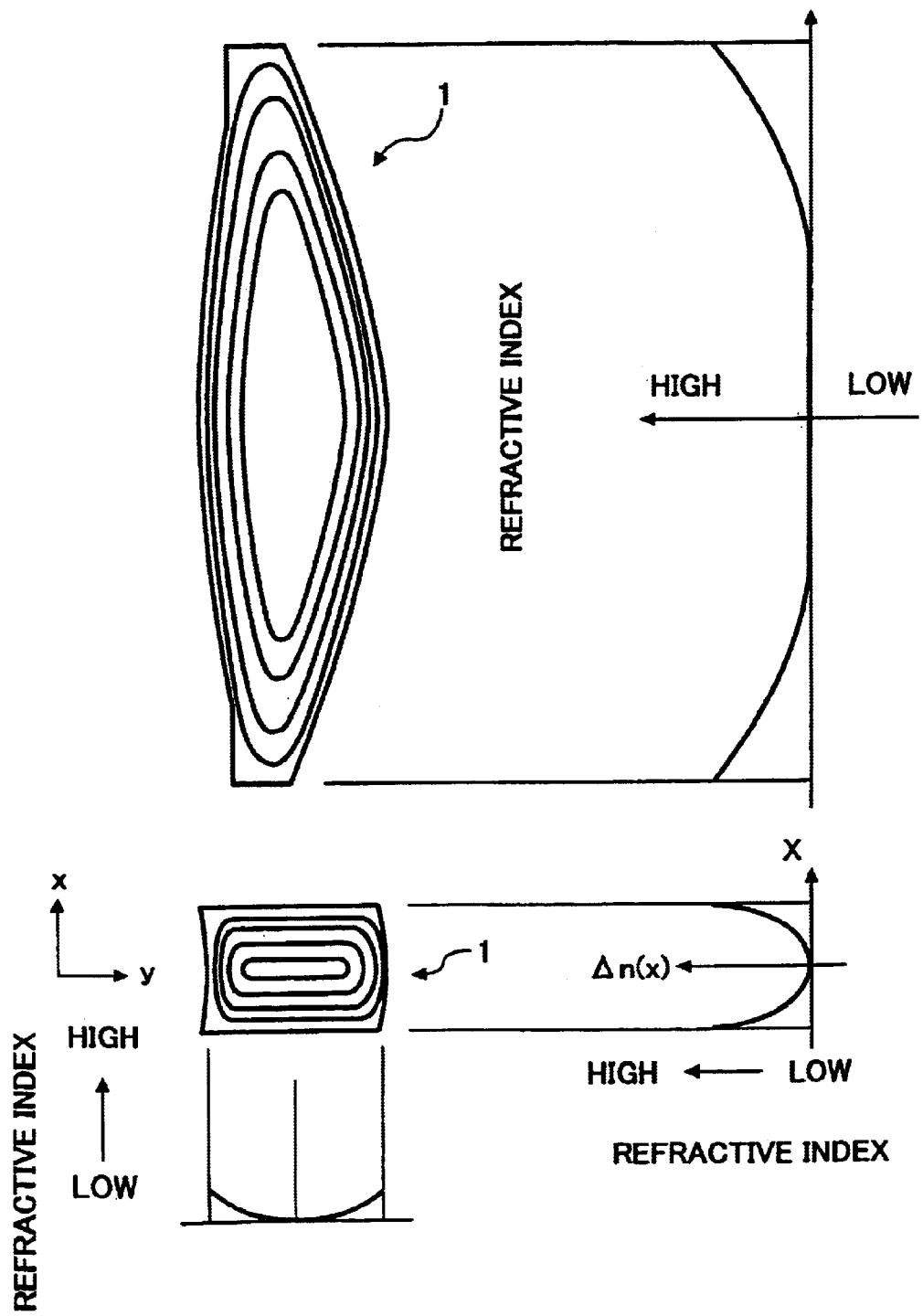
FIG. 15 depicts a model of refractive index distribution of the lens for optical scanning.

Here, the refractive index distribution Δn(x) is, as shown in FIG. 15, defined such that the value of a two-dimensional absolute refractive index in an xy cross section including the optical axis and parallel to the sub scanning direction is averaged in the y-axis direction, and is expressed as a one-dimensional relative refractive index with respect to the x-axis direction.

The term "within the luminous flux passing area of the lens" refers to a range where the luminous flux passes on the corresponding lens surface, as an effective write width on the image surface of the photosensitive member, with respect to the main scanning direction. Further, with respect to the sub scanning direction, it is desired that the luminous flux passing area of the lens be about ±2 millimeters, taking into consideration blur of the outgoing angle of the light source, and tumbling down of the deflector.

The refractive index distribution Δn(x) is expressed by a quadric approximation as described below:

$$\Delta n(x) \approx n_0 + \Delta n \cdot x^2 \quad (1)$$

where x refers to a distance in the direction orthogonal to the optical axis. The quadric coefficient Δn of x works as a lens power. Since the luminous flux of the beam on the lens is generally about 1 millimeter, the range of x at the time of calculating Δn is assumed to be ±1 millimeter herein.

The refractive index distribution can be considered to be the action of the lens, and hence, the relation between the focal length f' of the lens, Δn, and the thickness t of the lens can be expressed by the following expression, considering an "equivalent lens" with respect to the refractive index distribution, $$f' \approx -1/(2 \cdot \Delta n \cdot t) \quad (2)$$

However, t includes an instance of a plurality of lenses. Since Δn includes positive and negative signs, the focal length f' also includes positive and negative signs. Δn and f' have different signs.

The focal length of the lens, in which the refractive index distribution occurs, becomes a focal length of a combined system of a lens having an original focal length f having no refractive index distribution and a lens having a focal length f', and a change Δf in the focal length can be expressed approximately as:

$$\Delta f \approx -f^2/f' \quad (3)$$

Figure 11:
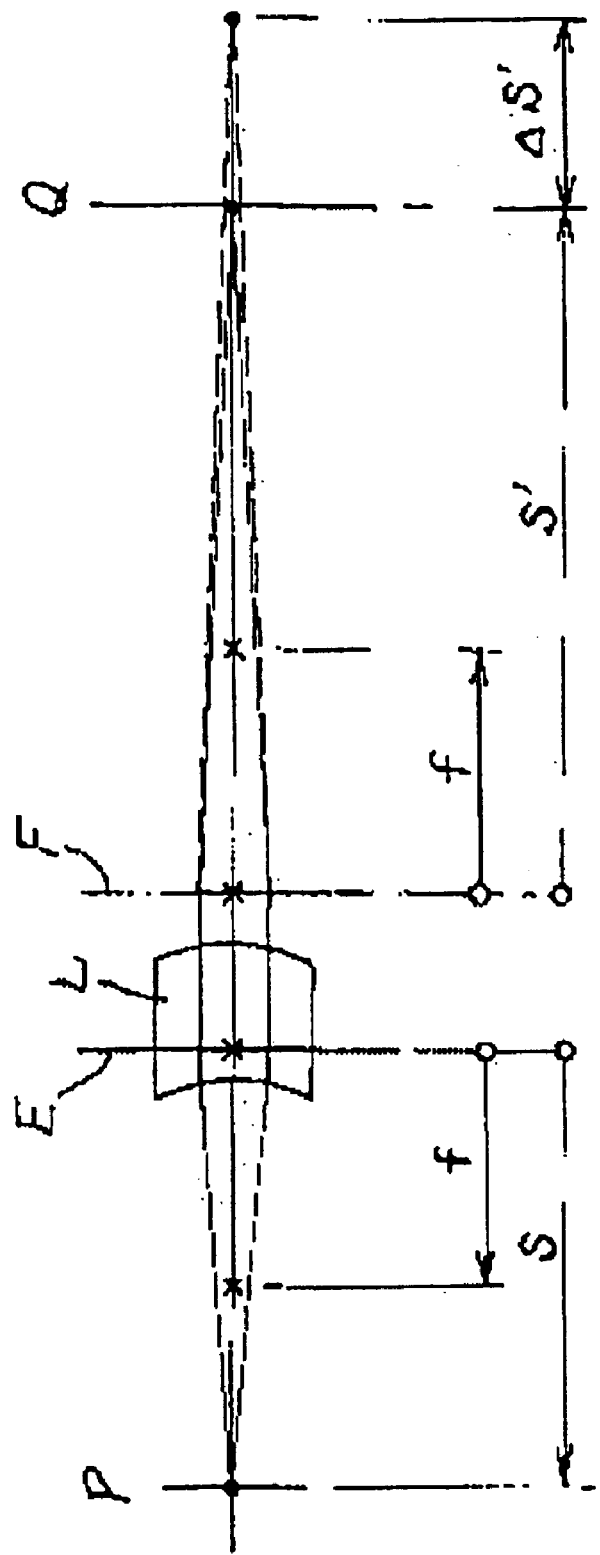
FIG. 11 is a schematic diagram for illustrating imaging relation of the lens for optical scanning.

FIG. 11 is a schematic diagram for illustrating imaging relation of the lens for optical scanning. Reference sign E denotes a front principal point of the lens, F denotes a rear principal point, L denotes a lens, P denotes an object point, Q denotes an image point, S denotes an object distance, S' denotes an image distance, and ΔS' denotes a defocus amount. In S' and ΔS', the right direction is designated as the positive direction.

The defocus amount ΔS' due to the refractive index distribution can be expressed by the following expression, using a paraxial imaging formula (1/S'=1/S+1/f) of a thin lens:

$$\Delta S' \approx \{S/(S-f)\}^2 \cdot \Delta f = -\{f \cdot S/(S+f)\}^2/f' = (S')^2 \cdot (2 \cdot \Delta n \cdot t) \quad (4)$$

Here, when the distance from the deflecting plane to the photosensitive member is designated as 1, and a lateral magnification of the optical scanning lens is designated as β, the expression (4) can be expressed approximately as follows:

$$\Delta S' \approx \{\beta/(\beta+1) \cdot 1\}^2 \cdot (2 \cdot \Delta n \cdot t) \quad (5)$$

In the optical scanning lens 30, the relation between the refractive index distribution Δn and the defocus amount ΔS' can be obtained by calculating the expression (5). Since β and t are values determined by the lens design, ΔS' is in proportion to Δn, including the positive and negative signs. When a defocus tolerance in the range of ±10% with respect to the beam spot diameter (diameter of beam intensity $1/e^2$) is defined as a depth tolerance, a theoretical depth tolerance w can be determined by the following expression, with respect to the beam spot diameter d, and the wavelength λ:

$$w \approx 1.487 \times d^2/\lambda \quad (6)$$

If defocus ΔS' can be suppressed within the range of the depth tolerance ±w, a stable beam spot diameter can be obtained on the photosensitive member. In other words, a lens in which a following expression (7) is established needs only to be formed:

$$W \geq |\Delta S'| \quad (7)$$

If expression (7) is used, it can be determined that how much size of the refractive index distribution Δn(x) of the lens is required so that the variation in the beam diameter is within the tolerance. Therefore, excellent beam spot diameter can be obtained by suppressing the refractive index distribution Δn(x) within a certain range.

When an example is shown by using actual figures, if an aimed beam diameter d is 70 micrometers, and the wavelength of the laser λ is 400 nanometers, the depth tolerance becomes w=18.2 millimeters from expression (6).

When the optical scanning lens is used under conditions that the optical path length l is 200 millimeters, the lateral magnification β is 1.0, the lens thickness t is 10 millimeters, and the effective diameter of the beam passing area is 4 millimeters (x=±2 millimeters), it is desired that the equivalent quadratic coefficient |Δn| generated due to the refractive index distribution be not larger than $9.1 \times 10^{-5}$, when calculated by the reverse operation of expression (5).

Further, in another method, if an aimed beam diameter d is 90 micrometers, and the wavelength of the laser λ is 650 nanometers, the depth tolerance becomes w=18.5 millimeters from expression (6).

When the optical scanning lens is used under conditions that the optical path length l is 200 millimeters, the lateral magnification β is 0.5, the lens thickness t is 20 millimeters, and the effective diameter of the beam passing area is 4 millimeters (x=±2 millimeters), it is desired that the equivalent quadratic coefficient |Δn| generated due to the refractive index distribution be not larger than $10.4 \times 10^{-5}$, when calculated by the reverse operation of expression (5).

The lens shape (radius of curvature, thickness, absolute refractive index) and the mounting accuracy are normally deviated from the design when being machined. It is desired to set the tolerance of the lens shape deviation to within 10 to 20% with respect to the depth tolerance. Therefore, it is necessary that the quadratic coefficient □Δn| of the refractive index distribution is:

$$0 < |\Delta n| < 8.5 \times 10^{-5}$$

When the nonuniformity of refractive index existing in the lens within ±2 millimeters in the sub scanning direction is designated as refractive index distribution Δn(x), and the minimum value in Δn(x) is designated as Δn_min, it is necessary to satisfy the condition of:

$$0 < |\Delta n(x) - \Delta n\_min| < 34 \times 10^{-5}$$

by assigning $\Delta n = 8.5 \times 10^{-5}$ and x=2 in expression (1). When |Δn(x)−Δn_min| becomes larger than $34 \times 10^{-5}$, the optical performance deteriorates, regardless of the size of the lens.

Further, in the actual use, following range is desired:

$$0.1 \times 10^{-5} < |\Delta n| < 4.0 \times 10^{-5}, \text{ and}$$

$$0.4 \times 10^{-5} < |\Delta n(x) - \Delta n\_min| < 16 \times 10^{-5}$$

When |Δn| exceeds the upper limit $4.0 \times 10^{-5}$, it is necessary to limit the use wavelength, or reduce the optical magnification β, and hence there is a restriction in the optical design. Further, when |Δn| is lower than the lower limit $0.1 \times 10^{-5}$, not only an error by measurement cannot be ignored, but also the time required for molding and the cooling time becomes long, thereby causing a cost increase.

By creating the optical scanning lens satisfying these conditions, an optical system in which the defocus amount due to the refractive index distribution is suppressed can be formed.

The plastic materials include poly carbonate (PC), poly methyl methacrylate (PMMA), and polyolefin resin, and the present invention is applicable to any of these materials. However, since the polyolefin resin likely causes the refractive index distribution, it is particularly effective, and can provide an optical scanning lens having excellent optical performance.

When a lens is manufactured by using the polyolefin resin, if the refractive index distribution can be measured in a nondestructive manner, good or bad of the optical characteristics of the lens can be determined, without performing actual measurement of the optical characteristics.

Figure 12:
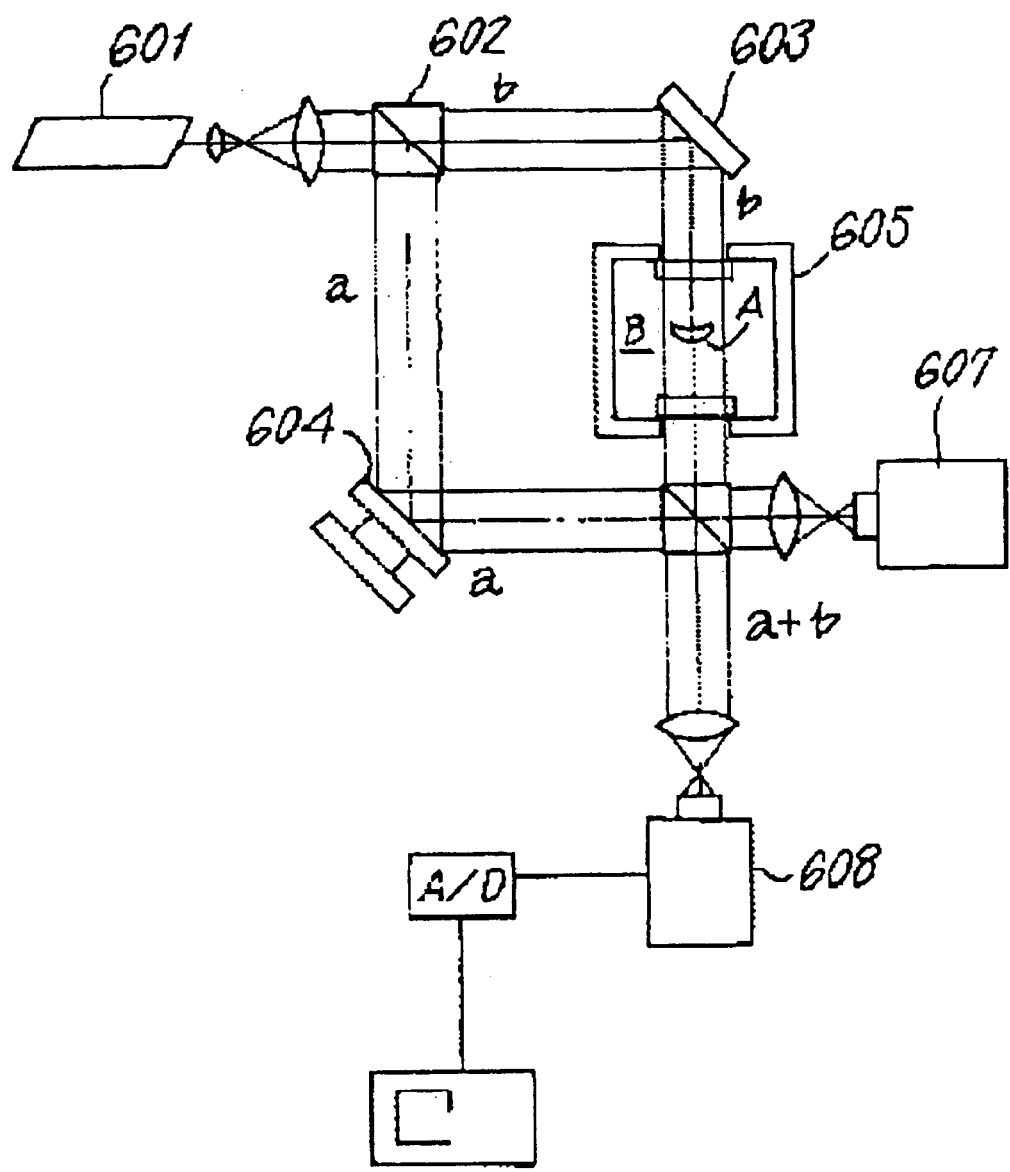
FIG. 12 is a schematic diagram of nondestructive refractive index distribution measuring apparatus.

FIG. 12 is a schematic diagram of nondestructive refractive index distribution measuring apparatus. Reference sign 601 denotes a laser light source, 602 denotes a beam splitter, 603 and 604 respectively denotes a mirror, 605 denotes a cell to be tested, 606 denotes a beam splitter, 607 denotes a monitor, 608 denotes a recorder, A denotes a lens to be tested, and B denotes a reagent.

Since Japanese Patent Application Laid-open No. H11-44641 explains the apparatus in detail, detailed explanation herein is omitted, and only the nondestructive principle is briefly explained here. The beam emitted from the laser light source 601 and enlarged is divided into two beams by the beam splitter 602, and one beam "b" is bent by the mirror 603 and enters into the cell to be tested 605. For the reagent B, a solution having substantially the same refractive index as that of the lens A to be tested is chosen. Therefore, the beam entering into the lens A to be tested is hardly refracted by the external shape of the lens to be tested, only affected by the refractive index distribution included in the lens to be tested, and emitted from the lens to be tested, and enters into the beam splitter 606. The other beam "a" is bent by the mirror 604, and enters into the beam splitter 606.

The both beams combined on the beam splitter 606 interfere with each other, and hence an interference fringe occurs in the beam entering into the monitor 607 and the beam entering into the recorder 608, by an amount modulated by the refractive index distribution of the lens A to be tested. By this interference fringe, the refractive index distribution can be calculated.

According to the present invention, in an optical scanning lens formed by using a cheap plastic material, the influence of the refractive index distribution occurring fatally can be suppressed to minimum.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lens made by molding a plastic material so that a reference axis corresponding to a turning point of an N-th order approximating curve of refractive index distribution $\Delta n(x)$ of the lens is displaced from a center of a passing area by a distance that is equal to or greater than 10% of a width of the passing area, wherein a luminous flux passes in the lens through the passing area.

2. The lens according to claim 1, wherein the reference axis is outside of the passing area.

3. The lens according to claim 1, wherein
the reference axis substantially matches with a center line of an external shape of the lens, and
the center line is outside of the passing area.

4. The lens according to claim 1, wherein
the center of the passing area substantially matches with a center line of an external shape of the lens, and
the reference axis is displaced from the center line by a distance that is equal to or greater than 10% of a width of the passing area.

5. The lens according to claim 1, wherein
the center of the passing area substantially matches with a center line of an external shape of the lens, and
the reference axis is outside of the passing area.

6. The lens according to claim 1, wherein the N-th order approximating curve is a quadratic approximating curve.

7. The lens according to claim 6, wherein a quadratic coefficient $\Delta n$ of the refractive index distribution $\Delta n(x)$ based on least squared approximation satisfies a condition $$0.1 \times 10^{-5} < |\Delta n| < 4.0 \times 10^{-5}$$

in a range of about ±1 millimeter from the center of the passing area.

8. The lens according to claim 1, wherein the plastic material is polyolefin resin.

9. A lens comprising:
a plurality of passing areas through each of which a luminous flux passes in the lens simultaneously, wherein
the lens is made by molding a plastic material so that, for each of the passing areas, a reference axis corresponding to a turning point of an N-th order approximating curve of refractive index distribution $\Delta n(x)$ of the lens is displaced from a center of the passing area by a distance that is equal to or greater than 10% of a width of the passing area, and
the passing areas are arranged in parallel with a center line of an external shape of the lens, being formed in one.

10. The lens according to claim 9, wherein the reference axis is outside of each of the passing areas.

11. The lens according to claim 9, wherein the N-th order approximating curve is a quadratic approximating curve.

12. The lens according to claim 11, wherein a quadratic coefficient $\Delta n$ of the refractive index distribution $\Delta n(x)$ based on least squared approximation satisfies a condition $$0.1 \times 10^{-5} < |\Delta n| < 4.0 \times 10^{-5}$$

in a range of about ±1 millimeter from the center of the passing area.

13. The optical scanning lens according to claim 9, wherein the plastic material is polyolefin resin.

14. An optical scanner comprising:
a light source that produces a luminous flux;
an optical deflector having a deflecting reflection surface that deflects the luminous flux from the light source at same angular velocity; and
a lens made by molding a plastic material, the lens condensing the luminous flux deflected as an optical spot on a plane to be scanned to perform optical scanning of the plane at a constant velocity, wherein
a reference axis corresponding to a turning point of an N-th order approximating curve of refractive index distribution $\Delta n(x)$ of the lens is displaced from a center of a passing area by a distance that is equal to or greater than 10% of a width of the passing area, wherein the luminous flux passes in the lens through the passing area.

15. An image forming apparatus comprising:
an optical scanner that includes
a light source that produces a luminous flux;
an optical deflector having a deflecting reflection surface that deflects the luminous flux from the light source at same angular velocity; and
a lens made by molding a plastic material, the lens condensing the luminous flux deflected as an optical spot on a plane to be scanned to perform optical scanning of the plane at a constant velocity, wherein
a reference axis corresponding to a turning point of an N-th order approximating curve of refractive index distribution $\Delta n(x)$ of the lens is displaced from a center of a passing area by a distance that is equal to or greater than 10% of a width of the passing area, wherein the luminous flux passes in the lens through the passing area.

* * * * *